(12) United States Patent
Chang

(10) Patent No.: US 7,492,587 B2
(45) Date of Patent: Feb. 17, 2009

(54) HEAT DISSIPATION MODULE AND COMPUTER HAVING SAME

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 274 days.

(21) Appl. No.: 11/478,420

(22) Filed: Jun. 28, 2006

(65) Prior Publication Data
US 2007/0097635 A1 May 3, 2007

(30) Foreign Application Priority Data
Oct. 28, 2005 (CN) .......................... 2005 1 0100797

(51) Int. Cl.
H05K 7/20 (2006.01)
F04D 29/54 (2006.01)
F28F 7/00 (2006.01)
F04B 17/00 (2006.01)

(52) U.S. Cl. .................. 361/687; 361/695; 361/683; 361/686; 415/203; 415/206; 165/80.2; 417/423.7

(58) Field of Classification Search ............... 361/681, 361/688, 695; 454/184; 415/203, 206; 165/80.2; 312/236
See application file for complete search history.

(56) References Cited

U.S. PATENT DOCUMENTS

| 5,879,141 | A | * | 3/1999 | Yokozawa et al. | ....... 417/423.7 |
|---|---|---|---|---|---|
| 6,164,690 | A | * | 12/2000 | Vian | .......................... 280/731 |
| 6,552,993 | B2 | | 4/2003 | Huang | |
| 6,606,254 | B2 | * | 8/2003 | Yoneda | ........................ 361/799 |
| 6,726,455 | B2 | * | 4/2004 | Horng et al. | ................... 417/14 |
| 6,972,950 | B1 | | 12/2005 | Wyatt et al. | |
| 7,029,247 | B2 | * | 4/2006 | Huang | ..................... 417/423.1 |
| 7,154,750 | B2 | * | 12/2006 | Li et al. | ....................... 361/695 |
| 7,317,614 | B2 | * | 1/2008 | Ruch et al. | ................... 361/687 |
| 2003/0223864 | A1 | * | 12/2003 | Horng et al. | ................ 415/203 |
| 2006/0078428 | A1 | * | 4/2006 | Zheng | ........................ 415/206 |

* cited by examiner

*Primary Examiner*—Jayprakash N Gandhi
*Assistant Examiner*—Zachary M Pape
(74) *Attorney, Agent, or Firm*—Andrew C. Cheng

(57) ABSTRACT

A heat dissipation module and an electronic device assembly having the heat dissipation module are provided. The electronic device includes an enclosure, a plurality of heat generating components received in the enclosure, an electronic device received in the enclosure, and a heat dissipation module received in the enclosure. The electronic device has a motor. The heat dissipation module includes a casing defining an airflow passage therethrough, and a rotation member being disposed at the airflow passage and having a plurality of blades. The airflow passage communicates with outside of the enclosure. The motor is capable of driving the rotation member to rotate to thereby expel heat inside of the enclosure to outside of the enclosure via airflow generated by the blades.

18 Claims, 6 Drawing Sheets

HEAT DISSIPATION MODULE AND COMPUTER HAVING SAME

TECHNICAL FIELD

The present invention relates to heat dissipation devices and, more particularly, to a heat dissipation module and a computer incorporating the heat dissipation module.

BACKGROUND

With the development of computer technology, electronic components such as central processing units (CPUs) have become progressively smaller, while at the same time their heat dissipation requirements have increased. Generally, heat dissipation devices are applied to the electronic components in order to facilitate dissipation of heat from the electronic components.

Nowadays, numerous kinds of heat dissipation devices have been developed for cooling the electronic components, for example, heat sinks or fans. Typically, a heat sink includes a base and a number of fins extending from a surface of the base, generally engaged with a fan adjacent to the fins. This kind of heat sink has a large volume and is popularly applied in a desktop computer because a typical enclosure of the desktop computer can provide enough space to accommodate the heat sink.

However, this heat sink is substantially unsuitable to be applied in a notebook computer due to a decreasingly limited space thereof. Specifically, due to marketing efforts and consumer preferences, designs for notebook computers tend to be increasingly thin and lightweight. For this heat sink to be accommodated into a notebook computer, there would have to be an undesirable increase in both the thickness and weight of the notebook computer.

Another significant marketing factor for the notebook computers is the length of time that a battery can power a notebook computer before the becoming discharged. The powerful fans used in many heat sinks tend to consume a significant amount of battery power, and would thus undesirably shorten the effective battery life if used. Although a larger battery could be used, this would result in an increase in the size and/or weight of the notebook computer, which as discussed above is undesirable.

What is needed, therefore, is a heat dissipation module that does not require special power equipment.

SUMMARY

In accordance with a preferred embodiment, a heat dissipation module includes a casing, a shaft received in the casing, a plurality of fan blades radially extending from the shaft, and a pressing member firmly connected to the shaft.

A computer includes an enclosure, a disk driver received in the base, and a heat dissipation module received in the enclosure. The disk driver includes a spindle motor. The heat dissipation module includes a casing, a shaft received in the casing, a plurality of fan blades radially extending from the shaft, and a pressing member firmly connected to the shaft. The pressing member is configured for detachably connecting the shaft to the spindle motor.

Other advantages and novel features will be drawn from the following detailed description of preferred embodiments when conjunction with the attached drawings, in which:

BRIEF DESCRIPTION OF THE DRAWINGS

Many aspects of the present heat dissipation module, computer and electronic device assembly can be better understood with reference to the following drawings. The components in the drawings are not necessarily drawn to scale, the emphasis instead being placed upon clearly illustrating the principles of the present heat dissipation module. Moreover, in the drawings, like reference numerals designate corresponding parts throughout the several views.

DETAILED DESCRIPTION OF THE PREFERRED EMBODIMENTS

Embodiments of the present invention will now be described in detail below and with reference to the drawings.

Figure 1:
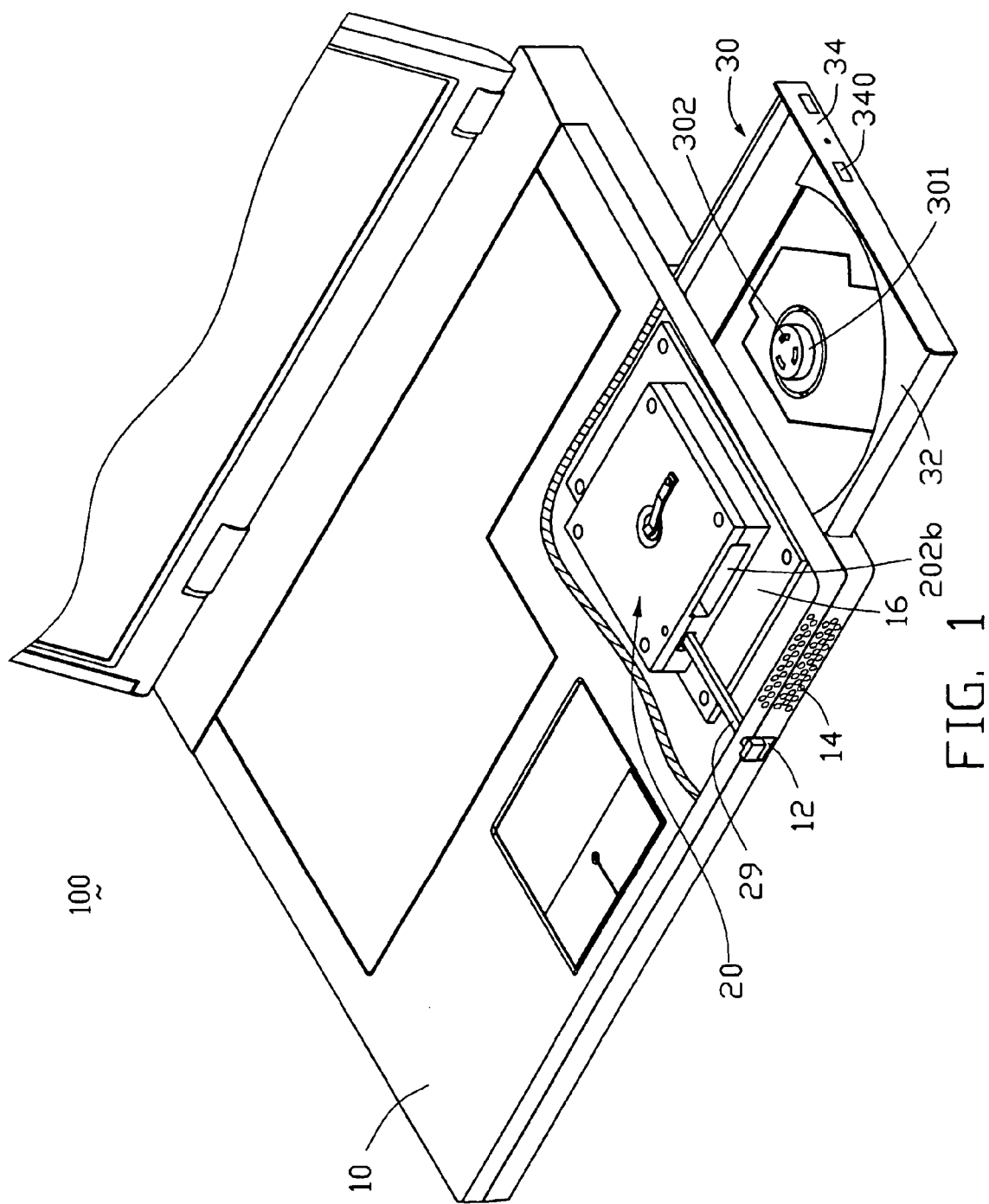
FIG. 1 is a schematic, isometric, partial cutaway view of a computer, showing a heat dissipation module and an optical disk driver, according to a preferred embodiment.

FIG. 1 illustrates a computer in accordance with a first preferred embodiment. The computer, for example, a notebook computer 100, includes an enclosure 10, a heat dissipation module 20, and an optical disk driver 30. The heat dissipation module 20 and the optical disk driver 30 are received in the enclosure 10. The heat dissipation module 20 is detachably mounted on the optical disk driver 30.

Figure 2:
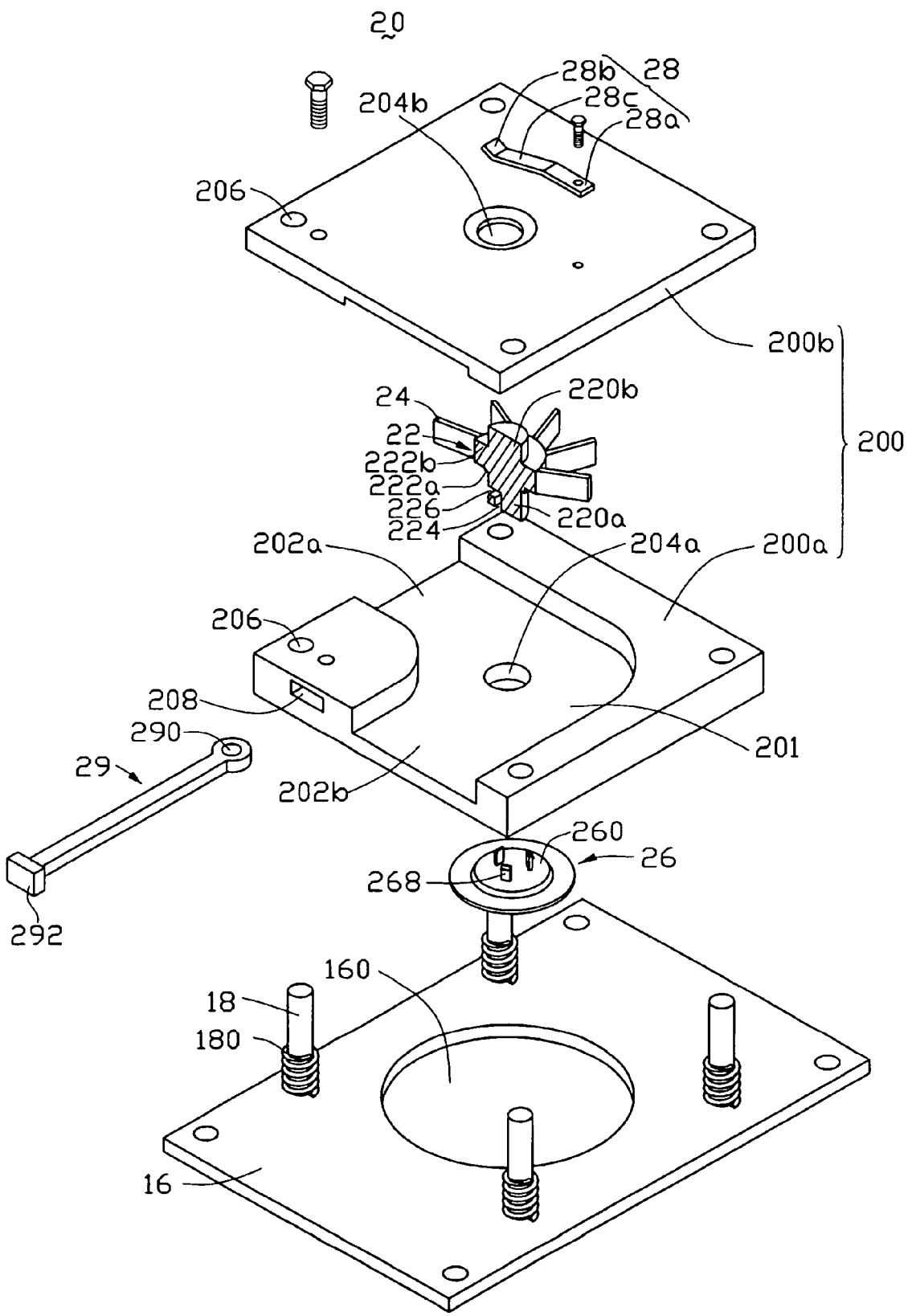
FIG. 2 is a schematic, isometric, exploded view of the heat dissipation module of FIG. 1.

FIG. 2 illustrates the disassembled heat dissipation module 20. The heat dissipation module 20 includes a casing 200, a shaft 22, a plurality of fan blades 24, and a pressing member 26. The fan blades 24 radially extend from the shaft 22. The shaft 22 and the fan blades 24 are received in the casing 200. The pressing member 26 is firmly secured to the shaft 22.

The casing 200 includes a lower base 200a and an upper base 200b secured to the lower base 200a. The lower and upper bases 200a and 200b cooperatively define a receiving cavity 201 for receiving the shaft 22 and the fan blades 24 therein. The receiving cavity 201 has two airflow openings 202a and 202b, for providing access to airflow through the receiving cavity 201 from the airflow opening 202a to the airflow opening 202b. The airflow opening 202a is in air communication with a heat-generating region where a plurality of heat generating components such as CPU chips are located. The airflow opening 202b is in air communication with outside environment. Thus, an airflow passage is formed between the two airflow openings 202a and 202b.

The lower and upper bases 200a and 200b define a first mounting hole 204a and a corresponding second mounting hole 204b disposed facing the first mounting hole 204a.

The shaft 22 includes a first end 220a, a second end 220b opposite to the first end 220a, a first stop flange 222a adjoining the first end 220a, and a second stop flange 222b adjoining the second end 220b. The first and second ends 220a and 220b are respectively mounted into the first and second mounting holes 204a and 204b thereby facilitating engaging of the shaft 22 to the casing 200. The fan blades 24 advantageously extend from the first stop flange 222b. The first and second stop flanges 222a and 222b have larger diameters than the first and second mounting holes 204a and 204b, respectively. The first end 220a projects out of the first mounting hole 204a and is partially exposed out of the lower base 200a. A total height of the first and second stop flanges 220a and 220b is advantageously smaller than a depth of the receiving cavity 201 thereby facilitating axial movement of the shaft 22 at a predetermined distance.

The first end 220a of the shaft 22 defines three uniform locking grooves 224. Each locking groove 224 includes an axial groove portion and a radial groove portion adjoining the axial groove portion. The axial groove portion of each locking groove 26 is defined in the first end 220a along an axial direction of the shaft 22. The radial groove portion is defined in the first end 220a along a radial direction of the shaft 22 and has a groove opening 226 defined on a surface of the first end 220a. The axial and radial groove portions cooperatively form a hook-shaped groove.

Figure 3:
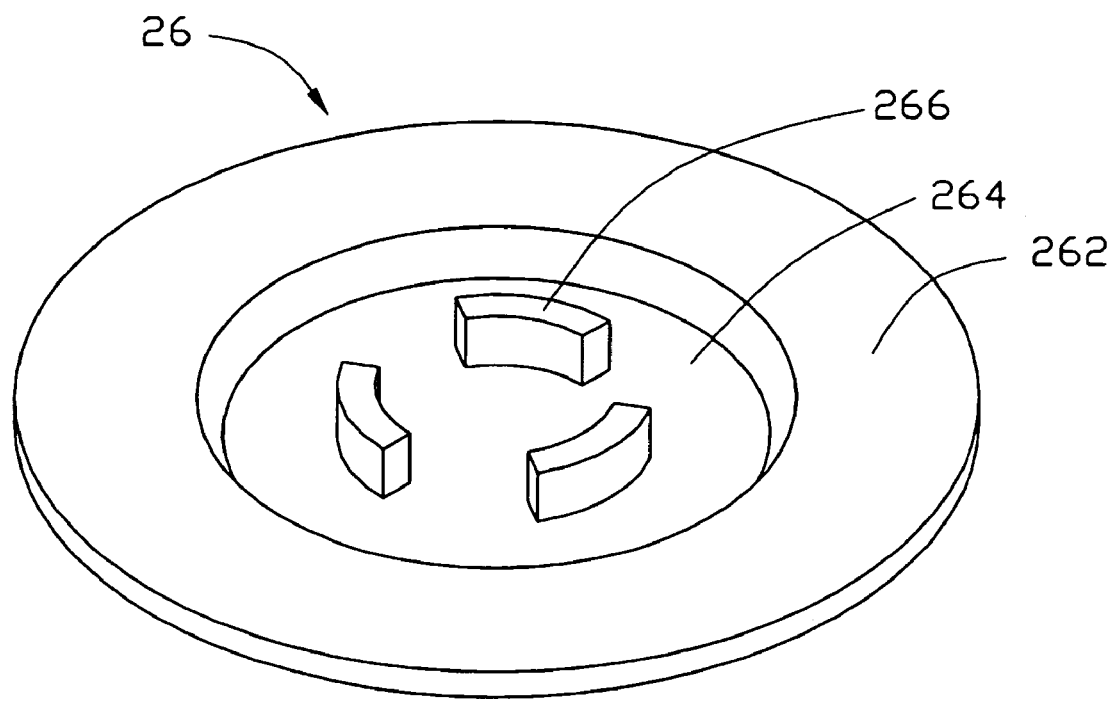
FIG. 3 is a schematic, isometric view of a pressing member of the heat dissipation module of FIG. 2.
Figure 4:
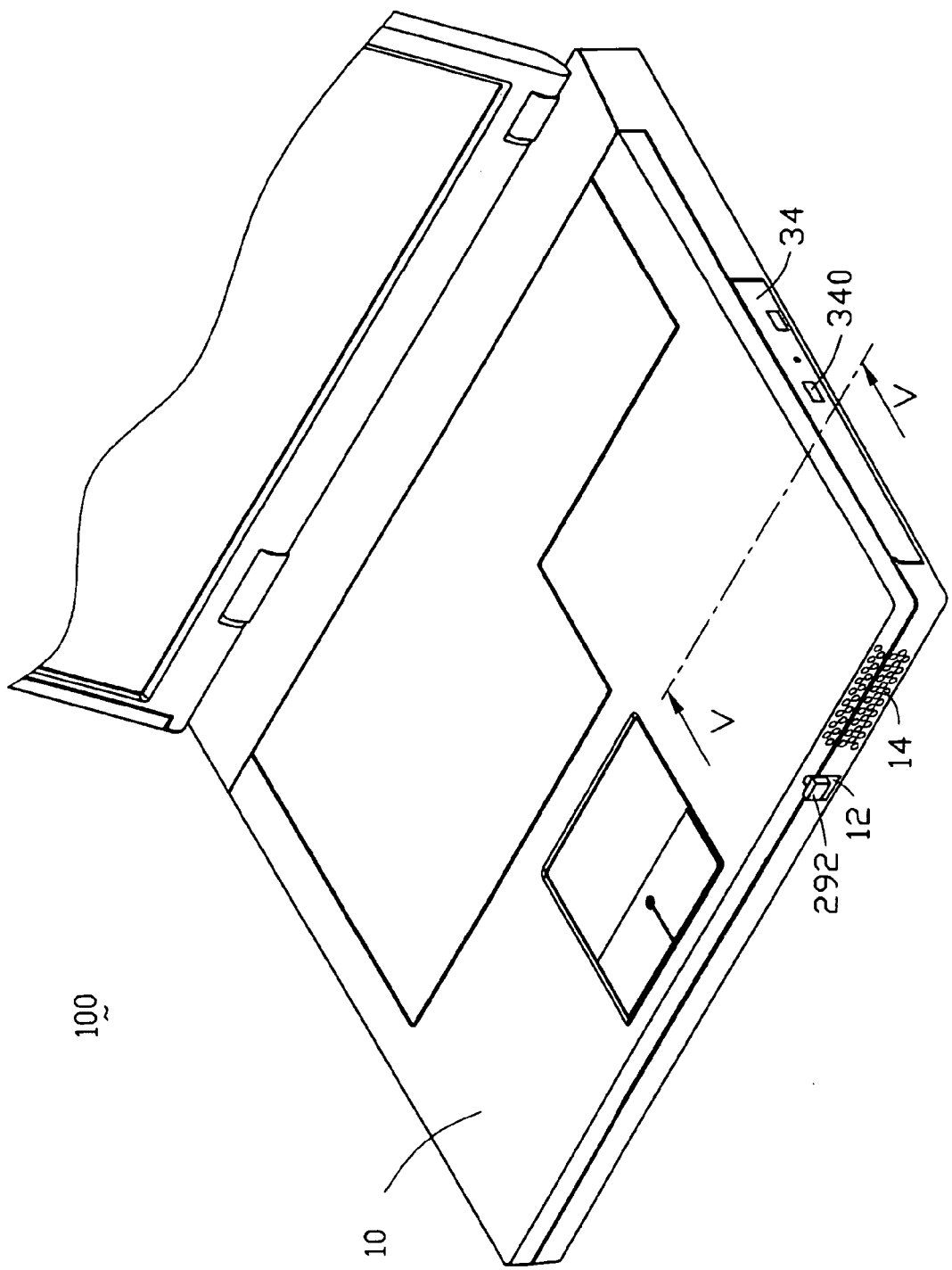
FIG. 4 is a schematic, isometric view of the notebook computer of FIG. 1.

Referring to FIGS. 2 and 3, the pressing member 26 may be in a tray form and includes a body 260, a step-shaped flange 262, three arcuate inserts 266, and three hooks 268. The step-shaped flange 262 adjoins a round peripheral edge of the body 260 and cooperatively defines a receiving hollow 264 with the body 260. The receiving hollow 264 extends below the body 260. Advantageously, the three inserts 266 uniformly project from an underside of the body 260 in the receiving hollow 264 along a direction parallel to the axis of the shaft 22 and are three equal portions of an imaginary ring, which is concentric with the body 260. The three hooks 268 are uniformly projected from a topside of the body 260 facing the casing 200 along a direction parallel to the axis of the shaft 22. Each hook 268 can be inserted into a respective locking groove 224 thereby firmly locking the hook 268 in the respective locking groove 224. Accordingly, the pressing member 26 is firmly secured to the shaft 22.

Furthermore, the lower and upper bases 200a and 200b define four coaxial orientation orifices 206 at four corners thereof, respectively. A support plate 16 supports the casing 200. The support plate 16 has four orientation pillars 18 formed at four corners thereof Each orientation pillar 18 is correspondingly inserted into a pair of respective orientation orifices 206. An elastic member 180 is coiled around each of the four pillars 18, for elastically supporting the casing 200. Accordingly, the four pairs of orientation orifices 206, the four orientation pillars 18, and the four elastic members 180 cooperatively form an orientation mechanism of the heat dissipation module 20.

Preferably, an elastic press sheet 28 is disposed on the casing 200. The press sheet 28 includes a securing end 28a, a pressing end 28b, and an elastic bridge portion 28c adjoining the two ends 28a and 28b. The securing end 28a is firmly secured to the upper base 200b by, for example, a screw. The pressing end 28b elastically presses against the second end 220b of the shaft 22 so as to prevent the second end 220b of the shaft 22 from projecting out of the upper base 200b. Alternatively, a magnetic sheet could be substituted for the elastic press sheet 28. This magnetic sheet could be disposed on the casing 200, the shaft 22 or the pressing member 26. The magnetic sheet is prone to be attracted to a magnet (not shown), generally disposed on a turntable 301 (See FIG. 5), thereby pulling the heat dissipation module 20 toward the turntable 301.

A moving mechanism can be connected to the casing 200, for driving the casing 200 to move along an axial direction of the shaft 22. The moving mechanism includes a rocker 29. The rocker 29 includes a swing end portion 290 and a press end portion 292. The casing 200 defines a hollow 208 in the lower base 200a, for receiving the swing end portion 290 of the rocker 29. The hollow 208 has an enough space to allow the swing end portion 290 of the rocker 29 to swing a predetermined angle along a plane perpendicular to the axis of the shaft 22.

Referring back to FIG. 1, an L-shaped guide groove 12 is defined in a sidewall of the enclosure 10 and is disposed facing the hollow 208. The press end portion 292 of the rocker 29 is inserted into the L-shaped guide groove 12 and can move along the L-shaped guide groove 12.

Figure 5:
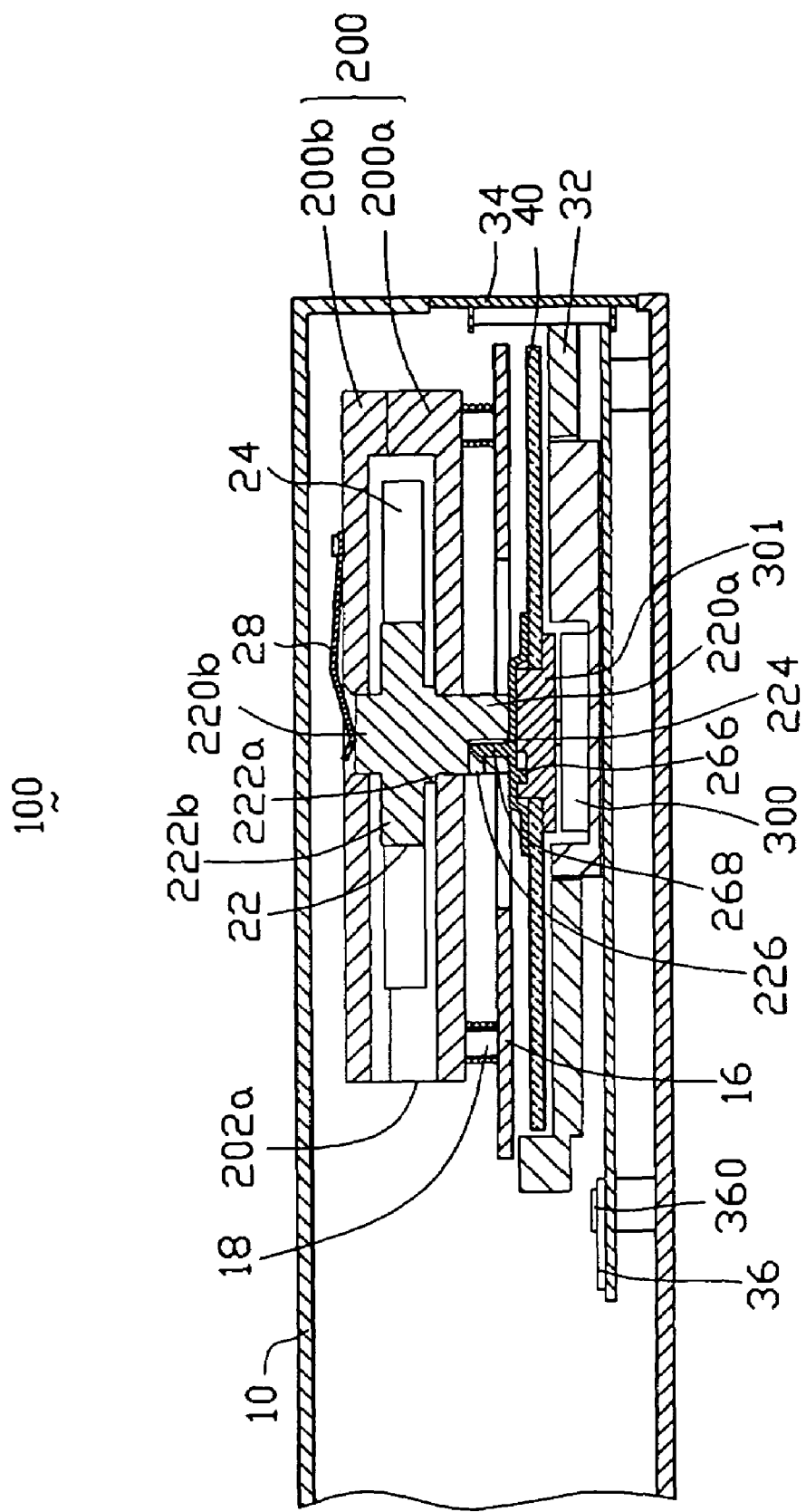
FIG. 5 is a schematic, cross-sectional view along line V-V of the computer of FIG. 4.

FIG. 5 illustrates a cross-sectional view of the heat dissipation module 20 mounted on the optical disk driver 30. The optical disk driver 30 includes a spindle motor 300 for rotating an optical disk 40, a turntable 301 mounted on the spindle motor 300, a tray 32 firmly secured to the spindle motor 300, and a circuit element 36. The optical disk 40 is received in the tray 32 and can rotate along with the turntable 301. The turntable 301 defines three arcuate recesses 302 (See FIGS. 1 and 2) each capable of receiving an insert 266. Accordingly, the pressing member 26 can be connected to the turntable 301 by inserting the three inserts 266 into the three recesses 302, thereby facilitating mounting of the heat dissipation module 20 to the optical disk driver 30. When mounting the pressing member 26 to the turntable 301, the receiving hollow 264 can receive a top portion of the turntable 301 exposed out of the optical disk 40. The optical disk 40 is thereby clamped between the step-shaped flange 262 and the turntable 301.

The tray 32 has a faceplate 34 for isolating the optical disk driver 30 from outside environment while the optical disk driver 30 is received inside the enclosure 10. At least one control button 340 is disposed on the faceplate 34. The circuit element 36 includes at least one control circuit 360 each controlling a respective control button 340. The control circuit 360 and the control button 340 can cooperatively control rotational speed of the spindle motor 300, rotational direction of the spindle motor 300, and read/write operations of an optical pickup head of the optical disk driver 30.

Figure 6:
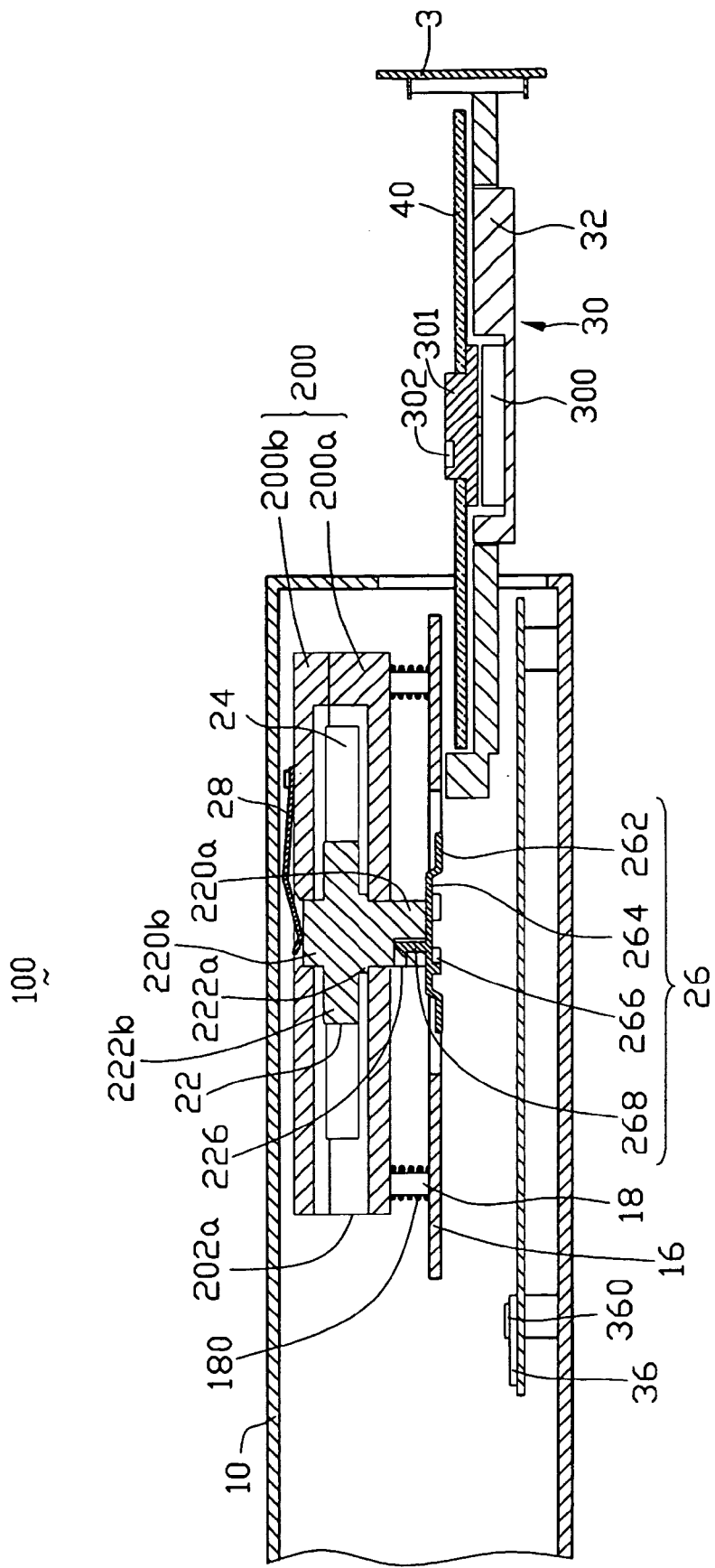
FIG. 6 is similar to FIG. 5, but showing the optical disk driver in an ejecting position.

Referring to FIG. 6, in assembling the heat dissipation module 20, the shaft 22 with the fan blades 24 is firstly loaded into the receiving cavity 201 and is pressed between the lower and upper bases 200a and 200b via the press sheet 28 which is secured on the upper base 200b. During assembly, the airflow opening 202b can be disposed facing a plurality of airflow orifices 14 formed on the enclosure 10, as shown in FIG. 1. The airflow opening 202a faces the plurality of heat generating components in the enclosure 10. The pressing member 26 is firmly secured to the shaft 22 by inserting the hooks 268 into their respective locking grooves 224. The swing end portion 290 of the rocker 29 is rotatably secured in the hollow 208. The casing 200 including the members above is mounted on the support plate 16 by sliding the four orientation pillars 206 into the four pairs of orientation orifices 206 thereby attaining the assembling of the heat dissipation module 20.

The heat dissipation module 20 is assembled to the notebook 1 by securing the support plate 16 to the enclosure 10 of the notebook 1 via, for example, a screw. The support plate 16 is advantageously located over the optical disk driver 30 with a small gap formed between the heat dissipation module 20 and the optical disk driver 30. Synchronously, the press end portion 292 of the rocker 29 should be slid into the L-shaped guide groove 12 of the enclosure 10 (see FIG. 1) and the axis of the shaft 22 is coaxial with the axis of the spindle motor 300 (see FIG. 5). The elastic members 180 can provide enough elastic support to the casing 200 so that the bottommost part of the pressing member 26 is a little higher than the topmost part of the turntable 301. As such, the optical disk driver 30 can readily be ejected from the enclosure 10 without scraping or impact between the heat dissipation module 20 and the optical disk driver 30.

In operation, the optical disk driver 30 is ejected from the enclosure 10 so that the optical disk 40 can be loaded into the optical disk driver 30, and then the optical disk driver 30 is inserted into the enclosure 10. The press end portion 292 of the rocker 29 is pressed downward along the L-shape guide groove 12 and then is locked to a transverse groove portion of the L-shape guide groove 12. The casing 200 moves downward against the elastic member 180 due to a pressure from the rocker 29. At the same time, the pressing sheet 28 and the rocker cooperatively press the casing 200 downward to cause the casing and the press member 26 to move downwards. The three inserts 266 of the pressing member 26 may occasionally aim at the three recesses 302 of the turntable 301 before the spindle motor is started up. When the spindle motor 300 is started up to rotate the turntable 301 by pressing a respective control button 340, due to a relatively small initial velocity of the spindle motor 300, the turntable 301 turns slowly through a certain angle (less than 60°) to attain a position where the three inserts 266 can each snap into their respective recesses 302 due to the pressure from the press sheet 28 and the rocker 29. Thus, the pressing member 26 is firmly connected to the spindle motor 300 and can rotate along with the spindle motor 300 thereby rotating the shaft 22 and the fan blades 24 along with the spindle motor 300.

Due to the rotation of the fan blades 24, a continuous airflow is formed in the enclosure 10 and passes through the receiving cavity 201 from the airflow opening 202a to the airflow openings 202b, and then to airflow orifices 14 (See FIG. 1). The airflow can carry away heat generated by the heat generating component near the airflow opening 202a to outside. As a result, the heat generating component is cooled down. The airflow opening 202a may face or be near many heat generating components received in the enclosure 10 so that the heat dissipation module 20 can dissipate heat generated from these heat generating components thereby expelling heat inside of the enclosure 10 to outside of the enclosure 10.

In the preferred embodiment, the spindle motor 300 is effectually utilized as a driving power for the heat dissipation module 20 so that the heat dissipation module 20 does not require special power equipment whilst still being capable of dissipating heat generated by the heat generating components of the notebook computer 1.

In other embodiments, the heat dissipation module 20 can have other alternative configurations. For example, the second mounting hole 204b can be substituted for a sleeve disposed on the upper base 200b so that the shaft 22 of the heat dissipation module 20 can be mounted on the upper base 200b by inserting the second end 220b of the shaft 22 into the sleeve. The pressing member 26 could be firmly connected to the first end 220a of the shaft 22, for example, by a screw. Alternatively, the pressing member 26 and the shaft 22 are integrally configured as a whole. In addition, it is to be noted that although three pairs of the inserts 266 and the recesses 302 are exemplarily illustrated herein, more or less pairs of the inserts 266 and the recesses 302 may be selected in the practical application of the heat dissipation module 20 by those skilled in the art.

Furthermore, the orientation pillars 18 could be directly secured to the enclosure 10 without use of the support plate 16. Each orientation pillar 18 has a flange radially extending therefrom, for supporting the four elastic members 180 coiled to the orientation pillars 18. The rocker 29 could be rotatably secured to the upper base 200b, for example by a screw, instead of the hollow 208 of the lower base 200a.

Moreover, the heat dissipation module above mentioned could be applied in other electronic device assemblies having electronic devices equipped with power motors, for example, an optical disk driver of a tabletop computer, a CD/DVD (compact disc/digital video disc) player etc. The heat dissipation module can be connected to the electronic device assembly by detachably connecting the pressing member of the heat dissipation module to the power motor of the electronic device assembly.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A heat dissipation module, comprising:
   a casing;
   a shaft rotatably received in the casing, the shaft comprising a first end and an opposite second end, the first end defining a plurality of locking grooves therein;
   a plurality of fan blades radially extending from the shaft; and
   a pressing member firmly connected with the first end of the shaft, the pressing member comprising a plurality of hooks each firmly inserting into a respective locking groove, the pressing member being configured for connecting with a driving device for driving the shaft to rotate.

2. The module as claimed in claim 1, wherein the casing comprises a lower base and an upper base secured to the lower base, the lower and upper bases cooperatively defining a receiving cavity for receiving the shaft and the fan blades therein.

3. The module as claimed in claim 2, wherein the receiving cavity has two airflow openings, for providing access to airflow through the receiving cavity from one opening to the other opening.

4. The module as claimed in claim 2, wherein one of the lower and upper bases defines a mounting hole configured for mounting a corresponding end of the shaft therein.

5. The module as claimed in claim 4, wherein the shaft comprises at least one stop flange radially extending therefrom, the at least one stop flange having an outer diameter larger than a diameter of the mounting hole, a total height of the at least one stop flange being less than a depth of the receiving cavity.

6. The module as claimed in claim 1, wherein an elastic press sheet is disposed on the casing, the elastic press sheet comprising two end portions, one end portion being firmly secured to the casing, the other end portion elastically pressing against the second end of the shaft.

7. The module as claimed in claim 1, further comprising a moving mechanism connected to the casing, the moving mechanism being configured for driving the casing to move along an axial direction of the shaft.

8. The module as claimed in claim 7, wherein the moving mechanism comprises a rocker, the rocker comprising a swing end portion and a press end portion, the casing comprising a hollow configured for receiving the swing end portion of the rocker.

9. A computer comprising:

a base;

a disk driver received in the base, the disk driver comprising a spindle motor; and a heat dissipation module received in the base, the module comprising:

a casing;

a shaft rotatably received in the casing, the shaft comprising a first end and an opposite second end, the first end defining a plurality of locking grooves therein;

a plurality of fan blades radially extending from the shaft; and a pressing member firmly connected with the first end of the shaft, the pressing member comprising a plurality of hooks each firmly inserting into a respective locking groove, the pressing member detachably connected to the spindle motor.

10. The computer as claimed in claim 9, wherein the casing comprises a lower base and an upper base secured to the lower base, the lower and upper bases cooperatively defining a receiving cavity for receiving the shaft and the fan blades therein.

11. The computer as claimed in claim 10, wherein the receiving cavity has two airflow openings, for providing access to airflow through the receiving cavity from one opening to the other opening.

12. The computer as claimed in claim 9, wherein the disk driver comprises a turntable disposed on the spindle motor, the pressing member comprising at least one insert extending from an opposite side of the pressing member relative to the hook, the turntable defining at least one recess each for receiving a corresponding insert.

13. The computer as claimed in claim 9, further comprising a moving mechanism connected to the casing, the moving mechanism being configured for driving the casing to move along an axial direction of the shaft.

14. The computer as claimed in claim 13 wherein the moving mechanism comprises a rocker, the rocker comprising a swing end portion and a press end portion, the casing comprising a hollow configured for receiving the swing end portion of the rocker, the base of the notebook computer defining an L-shaped guide groove for guiding the rocker to move along the guide groove.

15. An electronic device assembly comprising:

a base;

a plurality of heat generating components received in the base;

an electronic device received in the base, the electronic device having a motor; and a heat dissipation module received in the base, the heat dissipation module comprising:

a casing defining an airflow passage therethrough, the airflow passage communicating with outside of the base; and a rotation member being disposed at the airflow passage and having a plurality of blades, wherein the motor is detachably connected with the rotation member, and the motor is capable of driving the rotation member to rotate to thereby expel heat from inside the base to outside of the base via airflow generated by the blades, and the rotation member has a rotational axis coaxial with a rotational axis of the motor.

16. The electronic device assembly as claimed in claim 15, wherein the heat dissipation module is located above the electronic device.

17. The electronic device assembly as claimed in claim 16, wherein the heat dissipation module further comprises an elastic member connected between the casing and the rotation member for biasing the rotation member toward the motor.

18. The electronic device assembly as claimed in claim 16, wherein a rocker is connected to the casing and configured for driving the casing to move toward the electronic device, the rocker extending out of the base.

* * * * *